…

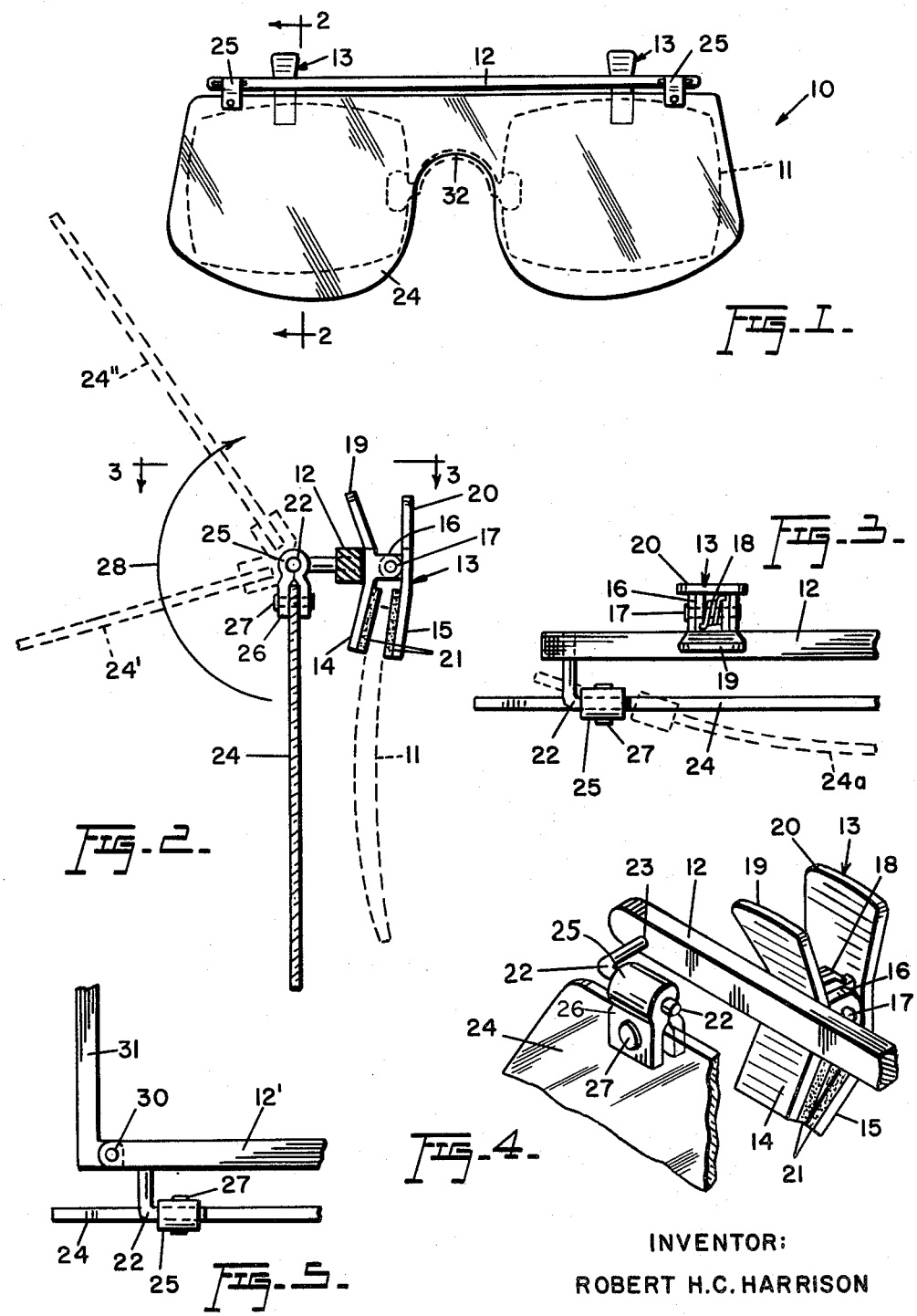

3,183,523
EYE SHADES
Robert H. C. Harrison, 400 Canadian Bank of Commerce
Bldg., 309 8th Ave. W., Calgary, Alberta, Canada
Filed May 14, 1962, Ser. No. 194,264
3 Claims. (Cl. 2—13)

This invention relates to new and useful improvements in eye shades, and the principal object of the invention is to provide a simple but highly effective shade device which may be conveniently employed to protect the eyes against glare from direct sunlight, or light reflected by snow, artificial light such as that from automobile headlamps, and the like. As such, the eye shade in accordance with the invention may be used while working outdoors, participating in sports, driving, and in numerous other activities.

One important feature of the invention resides in a structural arrangement of the eye shade device which permits the same to be readily applied, in the manner of an attachment, to a pair of conventional eyeglasses, and removed therefrom with equal expediency when the use of the shade is not desired.

Alternatively, a modified embodiment of the invention may be worn and used per se, that is, in the manner of but without the eyeglasses.

Another important feature resides in an adjustable mounting of the shade panel for swinging movement in a vertical plane, so that it may be selectively positioned either directly before the eyes or raised to any desired angle.

Another important feature of the invention resides in mounting the adjustable shade panel so that it may be quickly and easily replaced if scratched or otherwise damaged, without the necessity of replacing the shade device as a whole.

Other advantages of the invention reside in its simplicity of construction, efficient operation, and in its adaptability to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a front elevational view of the eye shade device applied as an attachment to conventional eyeglasses which are illustrated by dotted lines;

FIGURE 2 is an enlarged vertical sectional view, taken substantially in the plane of the line 2—2 in FIGURE 1;

FIGURE 3 is a fragmentary top plan view, taken in the plane of the line 3—3 in FIGURE 2 but with the eyeglasses omitted;

FIGURE 4 is a fragmentary perspective view of the subject shown in FIGURE 3; and FIGURE 5 is a fragmentary top plan view, similar to that shown in FIGURE 3, but illustrating a modified embodiment of the invention.

Referring now to the accompanying drawings in detail, more particularly to FIGURES 1–4 inclusive, the eye shade device is designated generally by the reference numeral 10 and, in this embodiment of the invention, is in the form of a readily applicable and removable attachment for a pair of conventional eyeglasses 11.

The shade device 10 embodies in its construction a rigid, transverse supporting bar 12 which is provided at transversely spaced points with a pair of resiliently biased clamps 13, whereby the entire device may be attached to the eyeglasses 11.

Each of the clamps 13 comprises a fixed jaw 14 and a coacting movable jaw 15, the fixed jaw being secured, as by soldering, for example, to the supporting bar 12. The two jaws 14, 15 are provided with interfitted ears 16 having a pivot pin 17 extending therethrough, so that the jaw 15 may move toward and away from the jaw 14. A coil spring 18 is positioned on the pin 17 between the ears and the ends of the spring engage the ears in such manner as to resiliently urge the jaw 15 toward the jaw 14, as will be clearly apparent. A pair of finger-pieces 19, 20 are formed integrally with and project upwardly from the respective jaws 14, 15, whereby the jaws may be opened against the action of the spring 18 when the device is to be applied to the eyeglasses 11. When the device is so applied, the supporting bar 12 extends across the top of the eyeglasses as shown, and pads 21 of suitable cushioning material such as felt or rubber are secured by adhesive, or the like, to the opposing surfaces of the two jaws, so as to prevent the eyeglasses 11 from being scratched. It may be noted at this point that although the eyeglasses 11 have been shown as being of the rimless type, the invention is equally applicable to eyeglasses with rims.

A first pair of hinge members, for example, a pair of coaxial pintles 22 is disposed forwardly of and secured to the end portions of the bar 12. These pintles have free opposing inner ends, while their outer ends are rearwardly angulated and suitably secured to the bar, as for example, by being pressed into apertures 23 formed in the end portions of the bar. Alternatively, the pintles may be soldered to the bar, if so preferred.

A transversely elongated shade panel 24, made from suitably colored plastic, Celluloid, or the like, is disposed forwardly of the eyeglasses 11 and is provided at its upper edge with a second pair of hinge members, for example, a pair of bearings 25 which receive the pintles 22 with a frictional rotating and sliding fit. The bearings 25 have pairs of ears 26 which receive the shade panel 24 therebetween, and suitable rivets 27 extend through the ears and through the shade panel to mount the bearings 25 in position thereon.

As will be readily apparent from FIGURE 2, the shade panel 24 may be disposed directly in front of the eyeglasses 11, or it may be swung upwardly as indicated by the arrow 28 to any desired adjusted position, as exemplified 24′ and 24″.

The material of the shade panel 24 is resiliently flexible and when the panel is flexed as indicated by the dotted lines 24a in FIGURE 3, the bearings 25 may be slid off the pintles 22 and the shade panel thus removed from the supporting bar 12. This facilitates economical replacement of the shade panel when it becomes scratched or otherwise damaged, without the necessity of replacing the device as a whole. Moreover, several shade panels of different colors and/or configurations may be selectively used with the same supporting bar.

As already noted, the shade device 10 shown in FIGURES 1–4 is in the form of an attachment for a pair of conventional eyeglasses 11. However, FIGURE 5 illustrates a modified embodiment of the invention which may be worn without eyeglasses. In this embodiment the clamps 13 are omitted and the ends of the supporting bar 12′ have connected thereto by means of suitable pivot pins 30 a pair of temple-pieces 31, which serve to retain the device in position in the manner of conventional eyeglasses, that is, with the temple-pieces extending rearwardly to hook behind the user's ears, while the recessed center portion 32 of the shade panel (see FIGURE 1) provides a bridge for supportable engagement by the user's nose when the shade panel is lowered. This supporting engagement with the nose, of course, is not obtained when the shade panel is raised and accordingly, the center portion of the supporting bar 12′ may be formed or otherwise provided with a nose engaging bridge (not shown) for supporting the bar regardless of adjustment of the shade panel.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In an adjustable eye shade, the combination of a transverse supporting bar, first and second pairs of rotatably connected hinge members having a common hinge axis parallel to said bar, the hinge members in the first pair being carried at a fixed spaced apart distance by the end portions of the bar, and an elongated and normally flat shade panel having the hinge members in the second pair provided on the end portions thereof, said panel being formed from resiliently flexible material and the spacing of the second pair of hinge members on the panel being lesser when the panel is flexed than when it is flat, the second pair of hinge members being slidable longitudinally relative to the first pair of hinge members and being separable therefrom by flexing of said panel so that the spacing of the second pair of hinge members is lesser than the fixed spacing of the first pair of hinge members.

2. The device as defined in claim 1 wherein said first pair of hinge members comprises a pair of coaxial pintles secured to the end portions of said bar and having free opposing ends, said second pair of hinge members comprising a pair of bearings secured to the end portions of said panel, said bearings being rotatable and slidable on said pintles.

3. An adjustable eye shade adapted for attachment to a pair of eye glasses, said eye shade comprising in combination a transverse supporting bar, a pair of resilient eye glasses engaging clamps provided at longitudinally spaced points on said supporting bar, first and second pairs of rotatably connected hinge members having a common hinge axis parallel to said bar, the first pair of hinge members comprising a pair of coaxial pintles secured at a fixed spaced apart distance to the end portions of the bar and having free opposing ends, and an elongated and normally flat shade panel formed from resiliently flexible material, the second pair of hinge members comprising a pair of coaxial bearings secured to the end portions of said shade panel, the spacing of said bearings on said panel being lesser when the panel is flexed than when it is flat, said bearings being rotatable and longitudinally slidable on said pintles and being slidably separable therefrom by flexing of said panel so that the spacing of said bearings is lesser than the fixed spacing of said pintles.

References Cited by the Examiner

UNITED STATES PATENTS

| | | | |
|---|---|---|---|
| 1,570,254 | 1/26 | Humes | 2—12 |
| 2,266,967 | 12/41 | Fuller | 2—10 |
| 2,543,108 | 2/51 | Helwig | 223—96 |
| 2,714,717 | 8/55 | Allman | 2—13 |
| 2,743,447 | 5/56 | Young | 2—13 |
| 2,818,774 | 1/58 | Olnhausen | 88—41 |
| 2,998,610 | 9/61 | Spero | 2—13 |
| 3,011,170 | 12/61 | Lutz | 2—13 |

JORDAN FRANKLIN, *Primary Examiner.*

THOMAS J. HICKEY, *Examiner.*